US008065953B2

(12) United States Patent
Verhoeven et al.

(10) Patent No.: US 8,065,953 B2
(45) Date of Patent: Nov. 29, 2011

(54) PREPARING DEVICE WITH A SUCTION DUCT FOR PREPARING A BEVERAGE FROM A POWDERY SUBSTANCE AND A HOT LIQUID

(75) Inventors: Ramon Eduard Verhoeven, Heerhugowaard (NL); Johannes Jacobus Van Steenderen de Kok, Heerhugowaard (NL); Carlos Nicolaas Jozef Maria Koopman, Heerhugowaard (NL)

(73) Assignee: Bravilor Holdings B.V., Heerhugowaard (NL)

( * ) Notice: Subject to any disclaimer, the term of this patent is extended or adjusted under 35 U.S.C. 154(b) by 533 days.

(21) Appl. No.: 12/303,210

(22) PCT Filed: May 31, 2007

(86) PCT No.: PCT/NL2007/050255
§ 371 (c)(1),
(2), (4) Date: Dec. 2, 2008

(87) PCT Pub. No.: WO2007/142519
PCT Pub. Date: Dec. 13, 2007

(65) Prior Publication Data
US 2009/0183641 A1      Jul. 23, 2009

(30) Foreign Application Priority Data

Jun. 2, 2006   (NL) .................................. 1031947

(51) Int. Cl.
*A47J 31/40* (2006.01)
*A47J 31/60* (2006.01)
(52) U.S. Cl. ...... 99/287; 99/289 R; 222/108; 222/129.4; 222/145.6; 366/139; 366/168.1

(58) Field of Classification Search .................... 99/279, 99/287, 289 R, 300; 222/108, 129.1, 129.3, 222/129.4, 135, 145.5, 145.6; 366/139, 168.1; *A47J 31/41, 31/60, 36/38*
See application file for complete search history.

(56) References Cited

U.S. PATENT DOCUMENTS

| | | | | | |
|---|---|---|---|---|---|
| 3,300,094 | A | * | 1/1967 | Rockola | 222/129.4 |
| 3,385,569 | A | * | 5/1968 | Bookout | 222/129.4 |
| 3,709,408 | A | | 1/1973 | Syverson | |
| 4,194,651 | A | * | 3/1980 | Martin et al. | 222/129.4 |
| 4,366,920 | A | * | 1/1983 | Greenfield, Jr. et al. | 222/145.5 |
| 5,192,002 | A | * | 3/1993 | Reese et al. | 222/129.4 |
| 5,344,050 | A | * | 9/1994 | Ficken | 222/129.4 |

(Continued)

FOREIGN PATENT DOCUMENTS

| | | |
|---|---|---|
| EP | 1088505 A | 4/2001 |
| JP | 2005335768 A * | 12/2005 |

*Primary Examiner* — Stephen F Gerrity
(74) *Attorney, Agent, or Firm* — Fliesler Meyer LLP

(57) ABSTRACT

Preparing device for preparing a beverage from a powdery substance and a hot liquid, the device comprising: at least one mixing chamber for mixing a quantity of the powdery substance and a quantity of the hot liquid; an inlet into the mixing chamber for the quantity of hot liquid; an inlet into the mixing chamber for the quantity of powdery substance; an extractor hood placed on the mixing chamber; an extraction duct connected to the extractor hood and provided with a suction device, such as a ventilating fan, for extracting vapor and dust particles from the mixing chamber via the extraction duct and the extractor hood; a first housing accommodating further components of the preparing device, such as electrical components and pipework, in which the extraction duct extends entirely along the exterior of the first housing.

17 Claims, 6 Drawing Sheets

U.S. PATENT DOCUMENTS

| | | | | |
|---|---|---|---|---|
| 5,839,610 A | * | 11/1998 | Reese et al. | 222/129.3 |
| 5,927,553 A | * | 7/1999 | Ford | 222/129.4 |
| 6,085,637 A | * | 7/2000 | Fukushima | 99/279 |
| 6,237,468 B1 | * | 5/2001 | Erikawa | 222/129.4 |

* cited by examiner

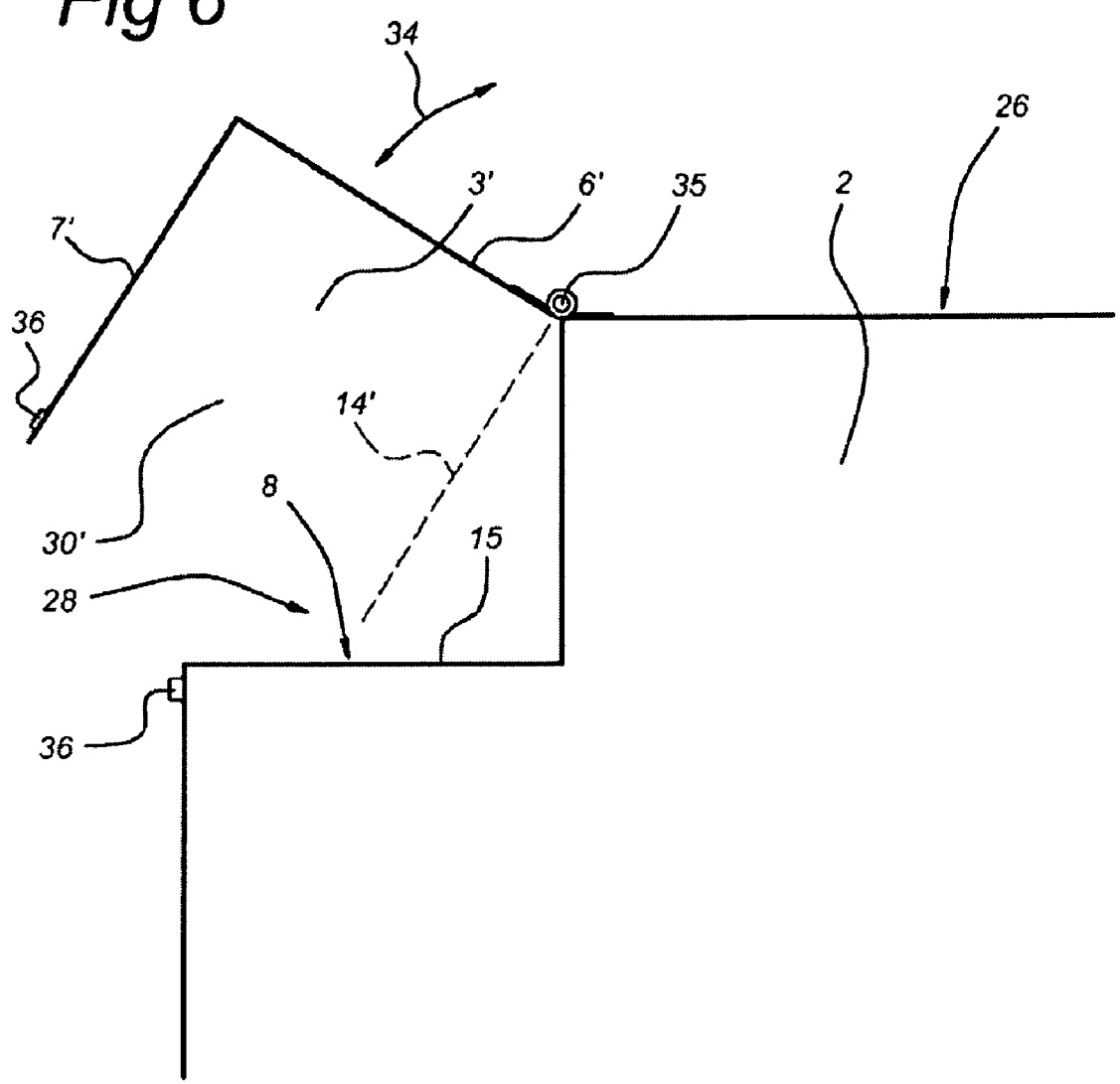

PREPARING DEVICE WITH A SUCTION DUCT FOR PREPARING A BEVERAGE FROM A POWDERY SUBSTANCE AND A HOT LIQUID

This application is a national stage application that claims priority under 35 U.S.C. 371 to Patent Cooperation Treaty Application No. PCT/NL2007/050255, entitled "Preparing device with a suction duct for preparing a beverage from a powdery substance and a hot liquid, as well as an extraction duct," inventors Ramon Eduard Verhoeven et al., filed May 31, 2007, and which has been published as Publication No. WO2007/142519, which application is herein incorporated by reference.

FIELD OF THE INVENTION

The invention relates to a preparing device for preparing a beverage from a powdery substance and a hot liquid, the preparing device comprising:
- at least one mixing chamber for mixing a quantity of the powdery substance and a quantity of the hot liquid using mixing means, it being possible to drive the mixing means by mean of drive means;
- an inlet opening into the mixing chamber for the quantity of hot liquid;
- an inlet opening into the mixing chamber for the quantity of powdery substance;
- an extractor hood placed on the mixing chamber;
- an extraction duct connected to the extractor hood and provided with suction means, such as a ventilating fan, for extracting vapour and dust particles from the mixing chamber via the extraction duct and the extractor hood.

BACKGROUND OF THE INVENTION

Such a preparing device is known from the prior art. This known preparing device is often used in practice for preparing hot beverages, such as coffee or tea.

Devices of this type prepare a hot beverage from hot water and powder. This powder is supplied to a mixing chamber from a reservoir. Hot water is then added to the mixing chamber in order to dissolve the powder in the former by mixing. The hot water is accompanied by vapour. If this vapour reaches the powder inlet, lumps will form in the latter and lead to clogging. In addition, the powder supplied also causes some fine powder particles to fly up and spread together with the vapour. The latter makes it necessary to extract the vapour and the swirling powder particles. Said extraction is effected by means of an extraction duct.

However, it is a drawback of the known device that the extraction duct is difficult to (un)install. In the known preparing devices, the extraction duct extends through the housing of the preparing device. In this case, the extraction duct winds itself through the spaces between the components accommodated in the housing, including electrical components and pipework. As a result, removal and fitting of the extraction duct involves complicated operations, such as disassembling the first housing. These operations are cumbersome and take up a relatively large amount of time. One of the results is that, in practice, the extraction duct is not cleaned or replaced sufficiently often. During use, the extraction duct tends to become soiled quickly, as the combination of air, moisture and powdery particles travelling through the extraction duct has the tendency to stick against the inner wall of the latter. This subsequently forms an encrusted substance on the inside walls of the extraction duct. As a result, the extraction duct initially becomes partially blocked and subsequently completely blocked. This has an adverse effect on the operation of the preparing device and on the flavour of the beverages prepared with the latter. If the extraction is poor, the preparing device will soil quickly. This has to be prevented due to food safety and hygiene standards for the preparing device. Furthermore, a partially or completely blocked extraction duct increases the risk of causing the extraction duct to leak, which may in turn lead to failures and malfunctions of the components accommodated in the housing, such as electrical components.

As the extraction duct extends through the housing, there is a great risk of failures and malfunctions of the components which are inside the housing when the extraction duct starts to leak. Another drawback is the fact that the housing has openings leading to the interior thereof. These openings increase the risk of pollution and moisture entering the housing, which will result in failures and malfunctions of the components housed in the housing.

A preparing device is disclosed in EP 1,088,505. In FIGS. 3, 4 and 5, this publication illustrates, in a highly diagrammatical form, a mixing chamber (9) provided with a mixing member (14) which is driven around a vertical shaft (13) by means of a mixing motor (10) placed vertically above the mixing chamber (9). Five of these mixing chambers are connected to an extraction duct 15 via connecting apertures (16A-E). This extraction duct (15) consists of a top section (16) and a bottom section 20. On the underside of the bottom section (20), a ventilating fan (23) is provided. In order to detach the top section (16) from the bottom section (20), vertical screws 24 have to be removed, which are accessible from below. This publication does not describe how this assembly is accommodated in the preparing device. However, as the mixing motors (10) have to be screened off by the housing when replacing the reservoirs (1A-G) for powder, and are in a slightly higher position than the upper side of the extraction duct (15), and because the reservoirs in FIG. 1 are at a relatively large distance above the mixing motors, it is clear that the mixing motors and the extraction duct will jointly be screened off with respect to the reservoirs, probably by means of a closed housing. The extraction duct in accordance with EP 1,088,505 can thus not be removed in a simple manner, something which is confirmed by the fact that the screws (24) are difficult to access from below.

SUMMARY OF THE INVENTION

It is an object of the invention to provide a preparing device in which the extraction duct can be (un)installed in a relatively simple manner. It is a further object to provide a preparing machine which is less susceptible to failures and malfunctions of the components accommodated in the first housing, such as electrical components.

This object is achieved by the preparing machine according to the invention, by the fact that the preparing device furthermore comprises:
- a first housing accommodating further components of the preparing device, such as electrical components and pipework; and
- a second housing accommodating the extraction duct and one or more reservoirs for powdery substance;

by the fact that the extraction duct extends entirely along the exterior of the first housing, and by the fact that the drive means for the mixing means of the at least one mixing chamber are situated in the first housing. As a result, the (un)installation of the extraction duct of the preparing device according to the invention does not require any complicated operations, such as the disassembly of the first housing. The result of this is that the extraction duct can be (un)installed in a relatively simple manner. Furthermore, the preparing device according to the invention is less susceptible to failures and malfunctions of the components accommodated in the first housing, as the first housing has no apertures for the extraction duct and the extraction duct cannot leak in the interior of the first housing. Preferably, the extraction duct essentially runs in a straight line. In this case, the extraction duct may comprise a bend near the connection to the extractor hood.

In one embodiment according to the invention, the first housing forms a service area. This term is defined in standard NEN-EN-IEC60335-2-75 "particular requirements for commercial dispensing appliances and vending machines" (article 3). According to this standard, such a preparing device is subdivided into a user area (article 3.109), a maintenance area (article 3.110) and a service area (article 3.111). The user area is the space where the user receives the hot beverages. The maintenance area is the space where daily maintenance takes place, in this case, consideration may be given to replenishing the powdery substance. The service area is the space where technical maintenance is carried out. The purpose of the first housing is to screen off the service area. As, in the preparing device according to the invention, the extraction duct is located entirely outside the service area, access to the extraction duct is simple.

According to the invention, the preparing device comprises a second housing accommodating the extraction duct and one or more reservoirs for powdery substance. In this case, the second housing may be a maintenance area, as a result of which it becomes possible to check, clean and, if necessary, replace the extraction duct in the course of daily maintenance. The purpose of the second housing is to screen off the maintenance area. The second housing may also be delimited by the first housing and comprise a door for access to the interior of the second housing. In this manner, an individual is able to gain access to the interior of the second housing in a simple manner and a preparing device of compact design is provided.

It should be noted that U.S. Pat. No. 3,709,408 discloses a preparing device for beverages having a first housing which delimits a so-called service area, and a second housing which delimits a so-called maintenance area. Furthermore, an extraction duct (100) is present. In column 2, lines 53-59 of this document, it is described how empty reservoirs 24 can be replaced by filled reservoirs by removing the front panel of the housing. Thus, the space behind this panel, the so-called maintenance area, is made accessible. However, behind the latter is the first housing which delimits the service area. In this case, however, there is no access to the extraction duct (100), which is accommodated in the interior of the first housing.

In a further embodiment, the extraction duct is of split design in the longitudinal direction in such a manner that the extraction duct can be opened in order to provide an access aperture extending along a longitudinal side for access to the interior of the duct. As a result of the fact that the extraction duct can be opened in this manner, it can readily be cleaned. The access aperture may extend essentially over the entire longitudinal direction of the extraction duct, which makes it possible to clean the extraction duct well over its entire length. The extraction duct may comprise a duct element and a wall part, the duct element comprising the access aperture extending along the longitudinal side and it being possible to close the access aperture by means of the wall part. Furthermore, the wall part may be provided on the external wall of the first housing, thus creating an extraction duct of simple design. The wall part may form part of this external wall, as a result of which a compact design is achieved.

In yet a further embodiment, the second housing comprises a blow-off passage for fluid extracted via the extraction duct and the extraction duct comprises a blow-off end which is connected to the blow-off aperture or is situated near the blow-off aperture. Thus, a good extraction of the extracted fluid is achieved, with the extracted fluid being transported away from the second housing. The term fluid is understood to mean a combination of air, vapour and powder particles.

In case the preparing device comprises a plurality of mixing chambers, a plurality of extraction ducts may be provided. This plurality of extraction ducts may be connected to one another. In this case, each mixing chamber may comprise a separate extraction duct. As a result, the extraction ducts can be (un)installed in a single operation. In order to simplify production, these extraction ducts may be formed by an integrally formed extraction housing.

In one embodiment, the extraction duct may be hingedly connected to the first housing.

The invention also relates to an extraction duct which is suitable for use in an abovementioned preparing device.

BRIEF DESCRIPTION OF THE DRAWINGS

One embodiment according to the invention will be explained in more detail below with reference to the drawings, in which:

FIG. 6 shows a diagrammatic view of the preparing device from FIG. 1 having a hinged extraction duct.

DETAILED DESCRIPTION OF THE DRAWINGS

Figure 1:
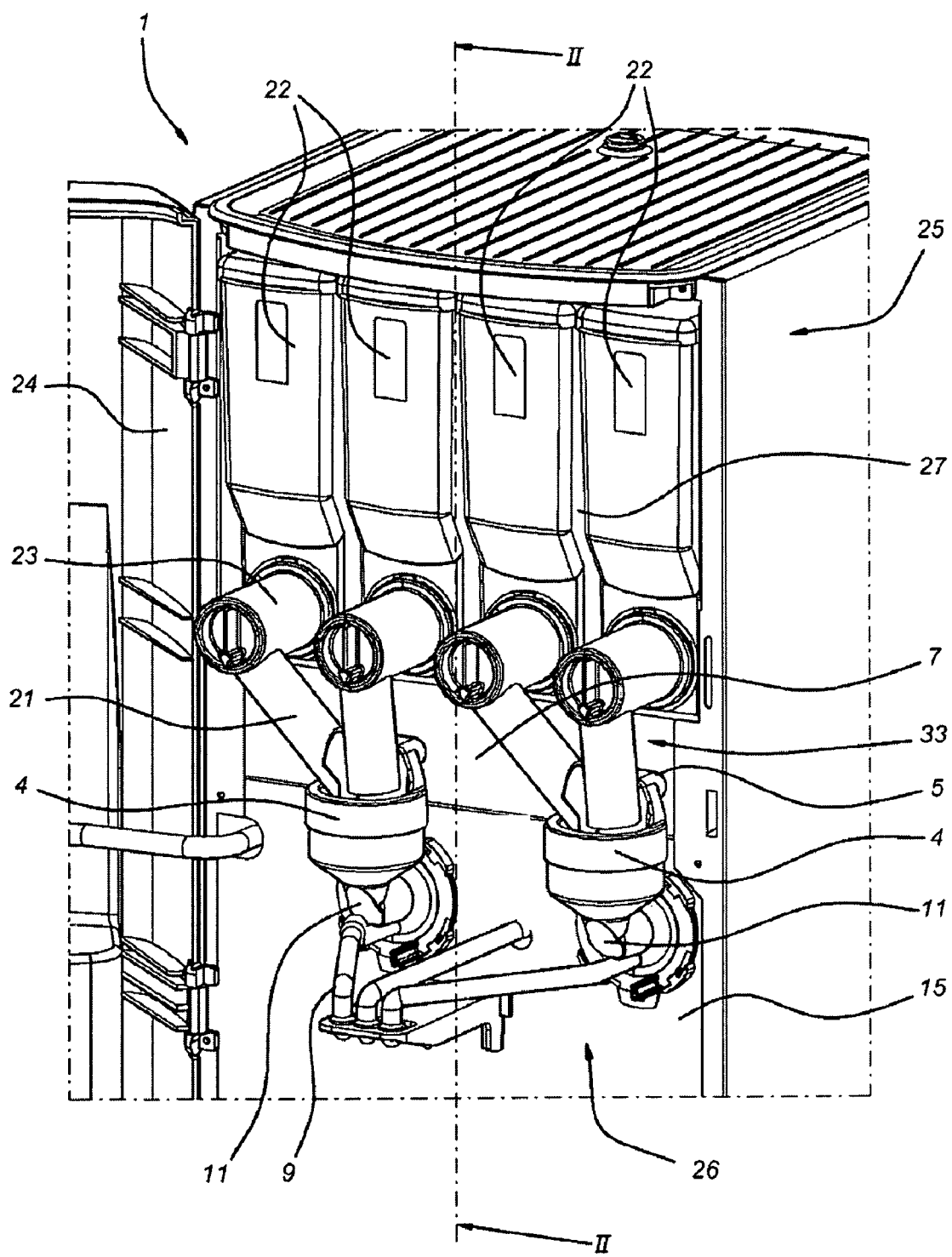
FIG. 1 shows a diagrammatic perspective view of a preparing device according to the invention.

FIG. 1 shows a perspective view of an embodiment of a preparing device according to the invention. The preparing device 1 comprises a second housing 25, which gives access by means of a door 24 to the interior of the second housing 25. Inside the second housing 25, there is a maintenance area. In the maintenance area 27, there are reservoirs 22 for powdery substance. The powder from the reservoirs 22 is conveyed into the two mixing chambers 11 by means of a powder conveying system 23 via an inlet 21 for powdery substance. In the mixing chambers 11, the powder is mixed with a certain quantity of hot liquid which is conveyed into the mixing chamber 11 by means of an inlet for a liquid (not shown).

The hot beverages flow out of the mixing chambers 11 via a beverage outlet 9 and towards the user area, where the beverages are presented to the user of the preparing device 1. An extractor hood 4 is placed on each mixing chamber 11. The extractor hood 4 extracts a combination of air, vapour and powdery particles from the mixing chamber 11.

Figure 2:
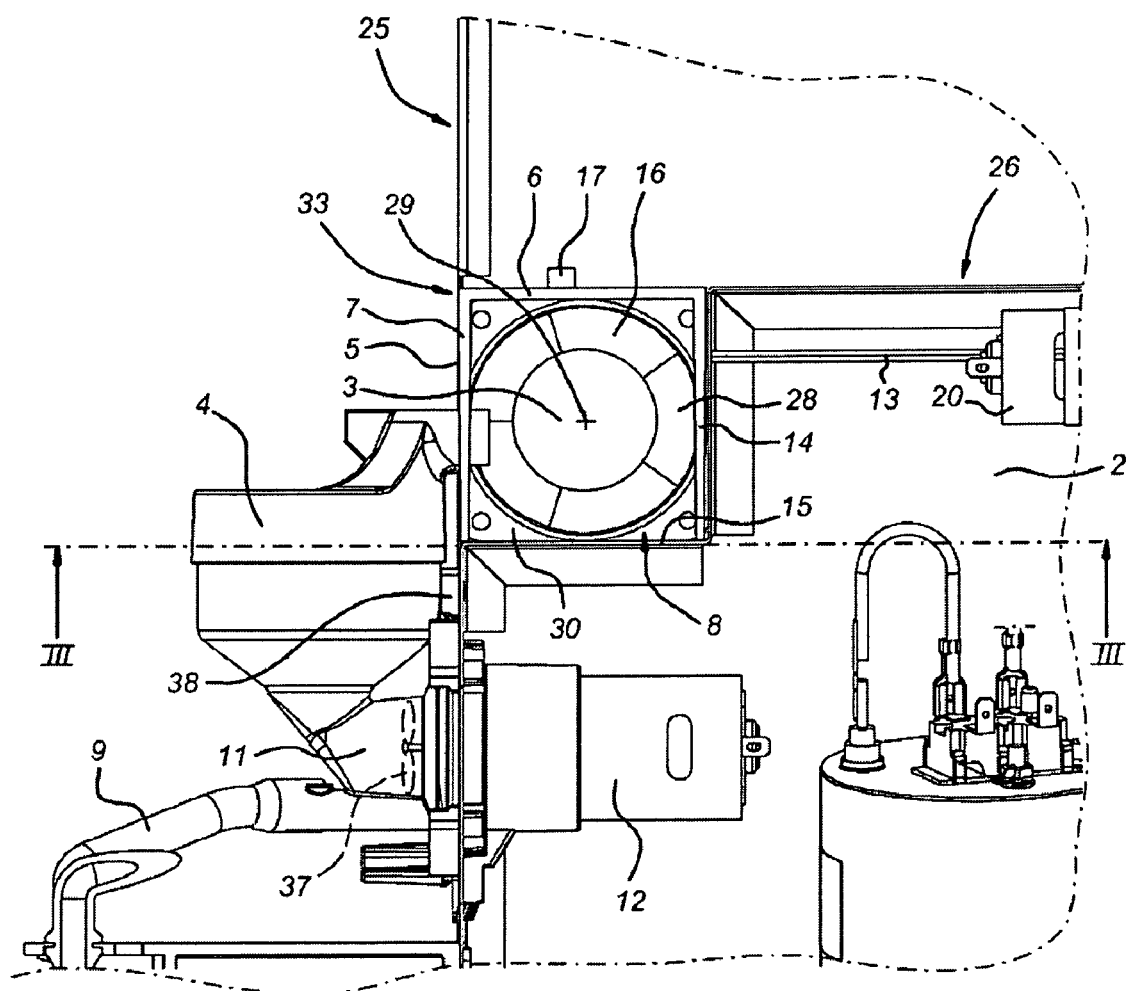
FIG. 2 shows a diagrammatic view in cross section along line II-II of the preparing device from FIG. 1.

FIG. 2 shows a view in cross section along line II-II of the preparing device from FIG. 1. For the sake of clarity, the reservoirs and powder inlet to the mixing chambers 11 are not illustrated. The extractor hood 4 is connected via an extraction opening 5 to an extraction duct 3 which is provided with a ventilating fan 16. Any other extraction means known from the prior art may be used instead of a ventilating fan 16.

Further components of the preparing device are accommodated in a first housing 26, such as a drive means 12 for the mixing means (not shown) situated in the mixing chambers 11, a power supply 13 for the ventilating fan 16 and a drive means 20 for the powder conveying system 23. The first housing 26 forms the service area 2. The service area 2 is screened off from the first housing 26 by the external wall 15. The extraction duct 3 extends entirely along the exterior of the first housing 26. The first housing 26 has an indentation 28 in which the extraction duct 3 is accommodated.

The extraction duct 3 has a top wall 6, a first side wall 7 and a second side wall 14. The walls 6, 7 and 14 form part of the extraction housing 33 which forms the extraction duct 3. In the situation illustrated, the walls 6, 7 and 14 together form a duct part having an access aperture 30. This access aperture 30 is closed off by a wall part 8 which is formed by the external wall 15 of the first housing 26. It is possible to remove the second side wall 14. In this situation, the walls 6 and 7 together form a duct part having an access aperture and this access aperture is closed off by the external wall 15 of the first housing 26. The extraction duct 3 has a rectangular cross section which is at right angles to the longitudinal direction 29. On the outside of the top wall 6, there are fitting lugs 17 for positioning the powder reservoirs 22 in the correct position.

Figure 3:
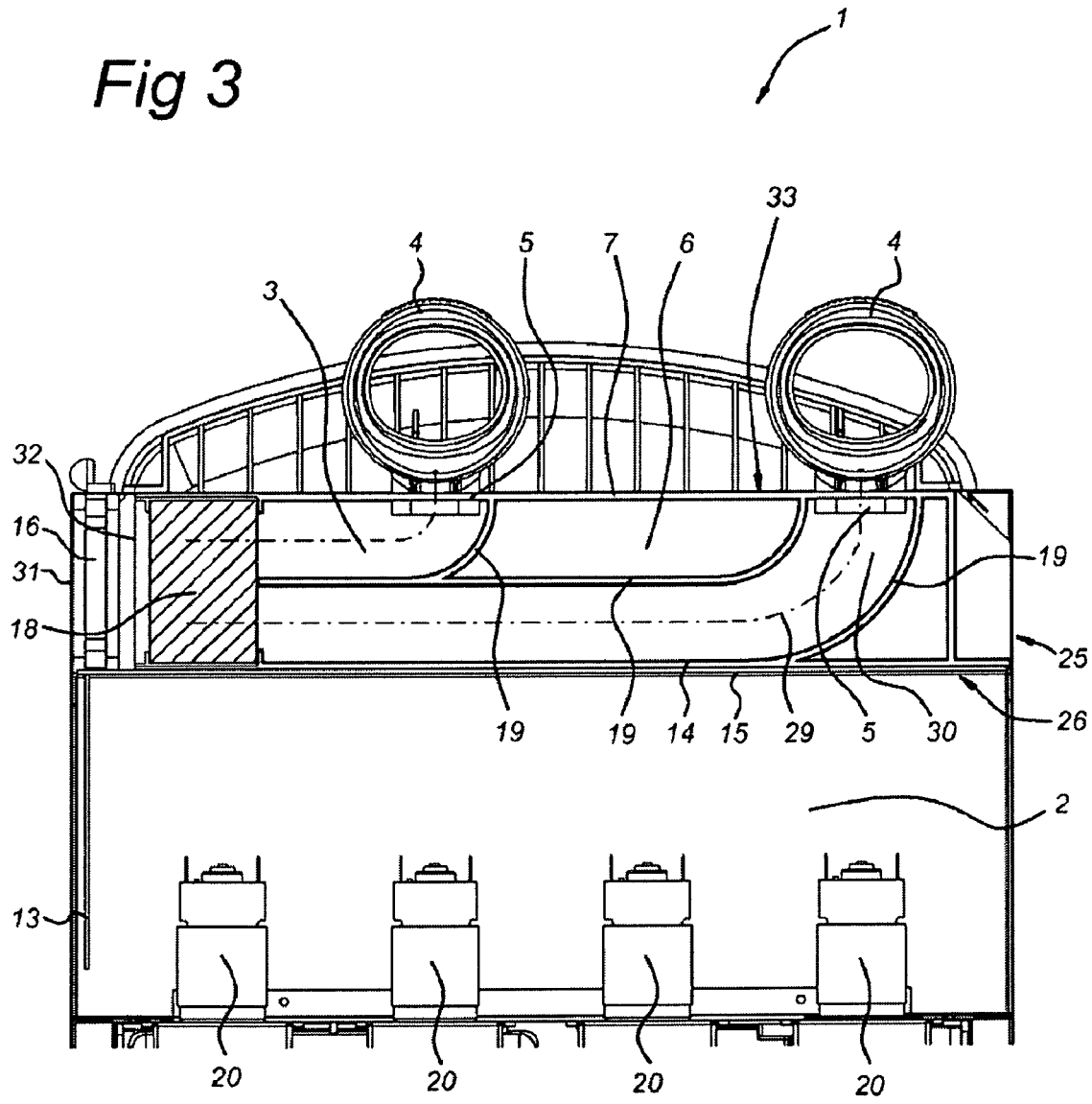
FIG. 3 shows a diagrammatic view in cross section along line III-III of the preparing device from FIG. 2.

FIG. 3 shows a cross-sectional view along line III-III of the preparing device from FIG. 2. In this figure, guide walls 19 are incorporated in the extraction housing 33 in such a manner that two separate extraction ducts 3 are obtained. As a result thereof, each extractor hood 4 is in individual fluid communication with the ventilating fan 16. The extraction ducts 3 have a longitudinal direction 29 and the access apertures 30 extend over the entire longitudinal direction 29 of each extraction duct 3. The guide walls 19 conduct the sucked-in fluid in such a manner that there are no sections in the extraction ducts 3 where the flow rate of the fluid is greatly reduced. If the flow rate of the fluid does decrease greatly in certain sections of an extraction duct 3, an accumulation of powdery particles results in those sections. Such accumulations will in time cause the extraction duct 3 to become blocked. By designing the guide walls 19 in this manner, the risk of (partial) blocking of the extraction ducts 3 is reduced. In addition, a filter 18 is accommodated in the extraction duct 3. The function of the filter 18 is to prevent soiling of the ventilating fan 16 by the vapour and the powdery particles in the air which is sucked in. The filter 18 is positioned near the ventilating fan 16. The second housing 25 furthermore comprises a blow-off passage 31 for fluid extracted via the extraction duct 3 and the extraction duct 3 comprises a blow-off end 32 which is situated near the blow-off passage 31. By means of the latter, the sucked-in fluid is removed from the second housing 25 in an effective manner.

Figure 4:
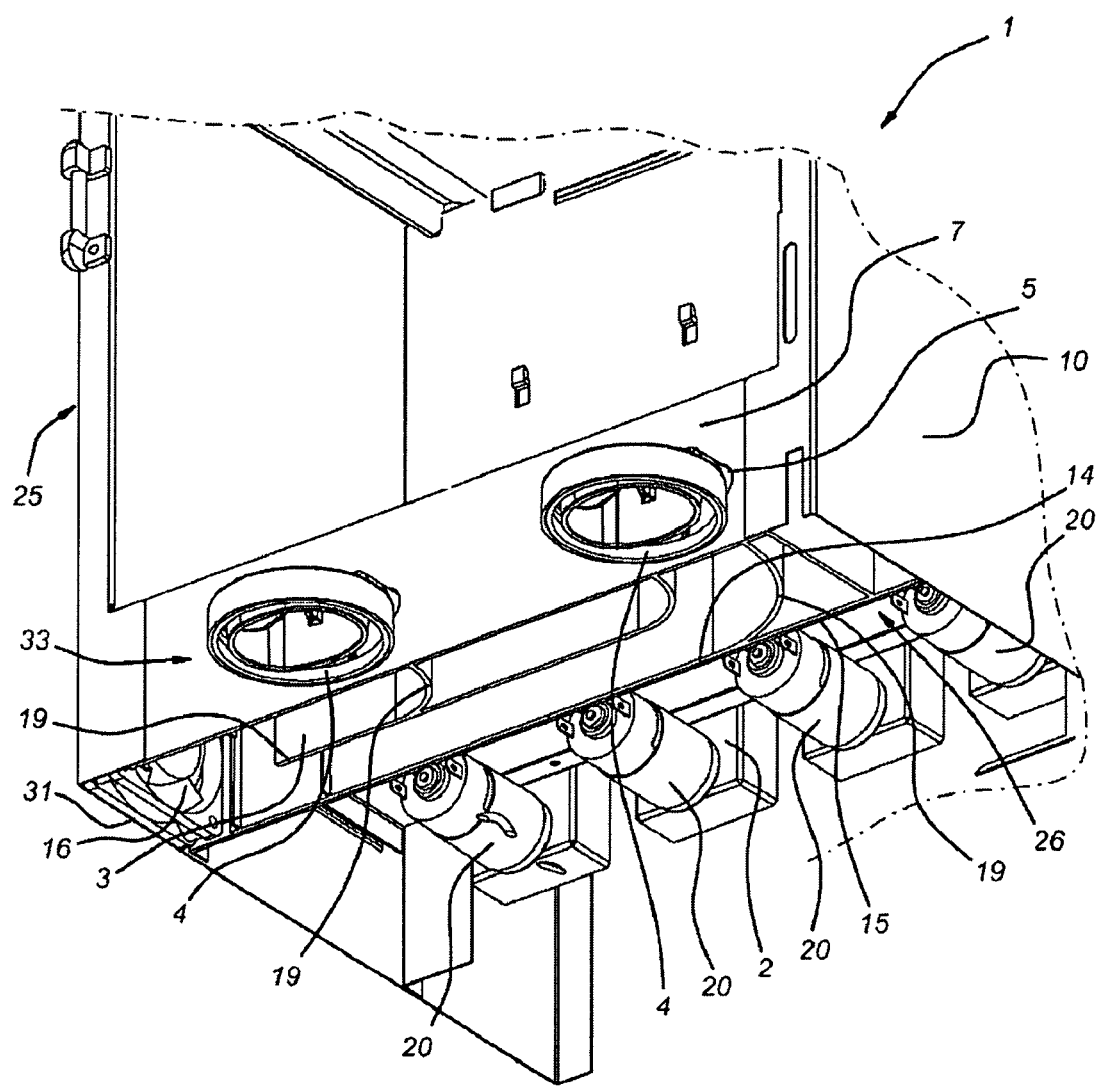
FIG. 4 shows a diagrammatic perspective bottom view of the cross section from FIG. 3.

FIG. 4 shows a perspective bottom view of the cross section from FIG. 3. In this case, the filter has not been shown for the sake of clarity.

Figure 5:
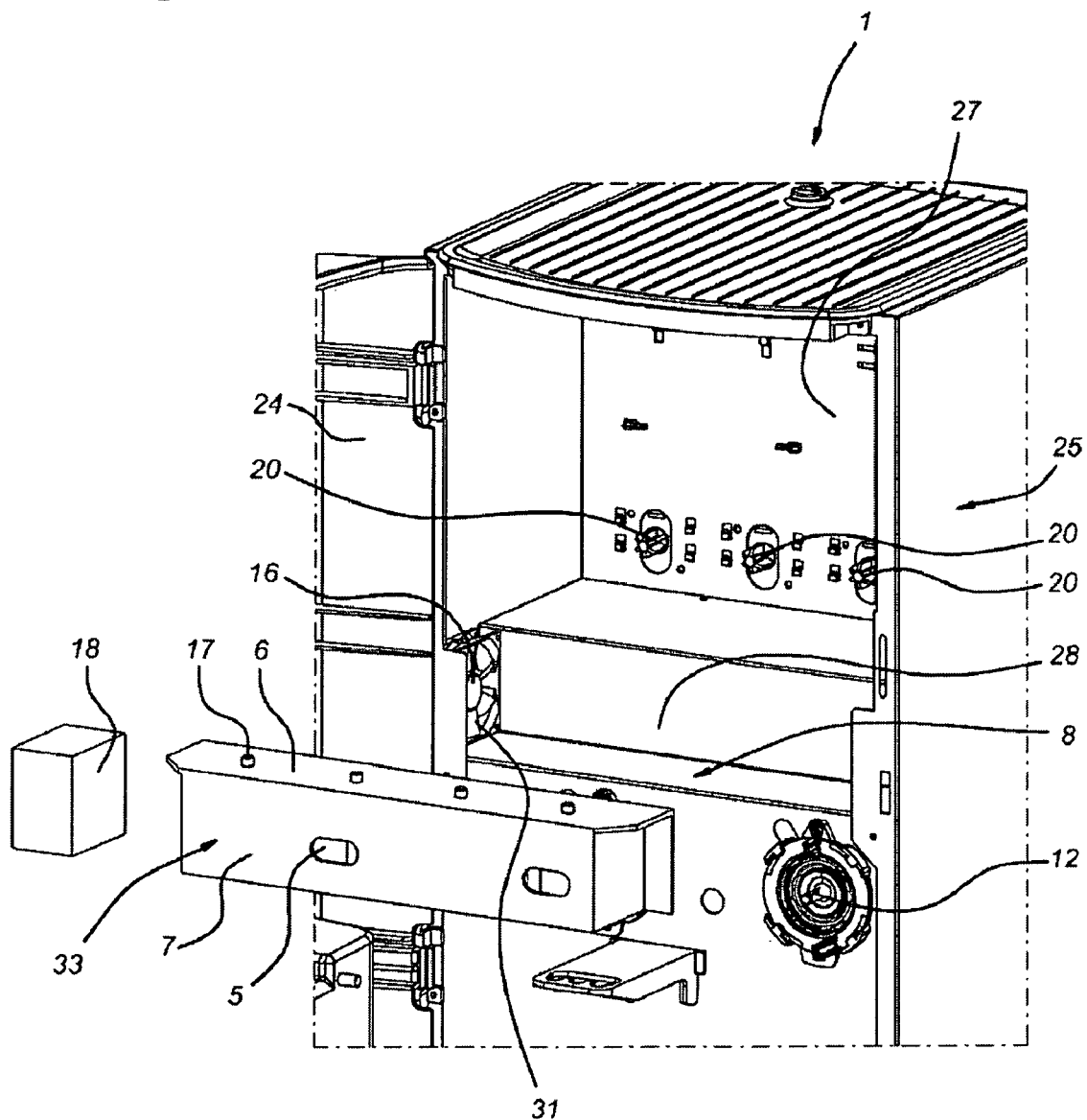
FIG. 5 shows a diagrammatic perspective view of a partially disassembled preparing device from FIG. 1.

FIG. 5 shows a perspective view of a partially disassembled preparing device from FIG. 1. It can clearly be seen that the extraction housing 33 of the extraction duct 3 is substantially box-shaped. The extraction housing 33 is preferably formed as a single part, for example by means of an injection-moulding process. In order to install the extraction duct 3, the filter 18 is placed in the extraction duct 3 and the housing 33 is placed in the indentation 28 of the first housing 26. When the extraction duct 3 is placed in the indentation 28, the walls 6, 7 and 14 (the duct element) are placed in such a manner that a part of the external wall 15 (the wall part 8) closes off the access aperture 30. In order to uninstall the extraction duct 3, the housing 33 only has to be lifted out of the indentation 28. In this way, direct access is achieved to the part of the external wall 15 which forms the wall part 8, as a result of which this wall part 8 can be cleaned in a simple manner. The filter 18 can be taken out of the extraction duct 3 in order to be replaced or cleaned. The access aperture 30 gives direct access to the extraction duct 3, as a result of which the latter can be cleaned in a simple manner. The extraction duct 3 can thus also be cleaned in a dishwasher.

FIG. 6 shows a view of the preparing device from FIG. 1 with a hinged extraction duct. In this case, the components of the preparing device which are identical to those of FIG. 1 have been denoted by the same reference numerals. The extraction duct 3' is connected to the first housing 26 at a hinge point 35. The extraction duct 3' has a top wall 6' and a first side wall 7' and may also have a second side wall 14'. These walls 6' and 7' together form a duct part having an access aperture 30'. The extraction duct 3' is hingedly connected to the external wall 15 of the first housing 26 in such a manner that the walls 6' and 7' can be displaced in the direction of arrow 34. The walls 6' and 7' can be placed in a folded-down position, in which the access aperture 30' is closed off by the wall part 8 of the external wall 15 of the first housing 26. As a result of the hinged displacement, the walls 6' and 7' can be placed in a folded-up position in which the access aperture 30' is made accessible. As a result, it is possible to access the interior of the extraction duct 3' so that the latter can be cleaned in a simple manner. By placing the walls 6' and 7' in the folded-up position, the wall part 8 also becomes accessible, as a result of which this part of the external wall 15 can be cleaned in a simple manner. The first side wall 7' and the external wall 15 are provided with interacting securing means 36 for securing the extraction duct 3'.

It will be clear to the person skilled in the art that many variants of the preparing device according to the invention are possible without departing from the scope of protection sought in the claims.

The invention claimed is:

1. A preparing device for preparing a beverage from a powdery substance and a hot liquid, the preparing device comprising:
    at least one mixing chamber for mixing a quantity of the powdery substance and a quantity of the hot liquid using a mixing means driven by a drive means;
    an inlet into the mixing chamber for the quantity of hot liquid;
    an inlet into the mixing chamber for the quantity of powdery substance;
    an extractor hood placed on the mixing chamber;
    an extraction duct connected to the extractor hood and provided with a suction means for extracting vapor and dust particles from the mixing chamber via the extraction duct and the extractor hood;
    wherein the preparing device furthermore comprises:
    a first housing accommodating further components of the preparing device; and
    a second housing accommodating the extraction duct and at least one reservoir for the powdery substance;
    wherein the extraction duct extends entirely along an exterior of the first housing, and
    wherein the drive means for the mixing means of the at least one mixing chamber is situated in the first housing.

2. Preparing device according to claim 1, wherein the first housing forms a service area.

3. Preparing device according to claim 1, wherein a powder conveying system with a drive means is provided for the at least one reservoir, wherein said drive means of the powder conveying system for the at least one reservoir is accommodated in the first housing, and wherein a power supply for the suction means is accommodated in the first housing.

4. Preparing device according to claim 3, wherein the second housing is delimited by the first housing and a door for access to an interior of the second housing.

5. Preparing device according to claim 3, wherein the second housing forms a maintenance area.

6. Preparing device according to claim 1, wherein the first housing comprises an indentation in which the extraction duct is accommodated.

7. Preparing device according to claim 1, wherein the extraction duct is of split design in a longitudinal direction, whereby the extraction duct can be opened in order to provide an access aperture extending along a longitudinal side for access to an interior of the duct.

8. Preparing device according to claim 7, wherein the access aperture extends substantially over the entire longitudinal direction of the extraction duct.

9. Preparing device according to claim 7, wherein the extraction duct comprises a duct element and a wall part, wherein the duct element comprises the access aperture extending along the longitudinal side and wherein the access aperture can be closed off by means of the wall part.

10. Preparing device according to claim 9, wherein the wall part is provided on an external wall of the first housing.

11. Preparing device according to claim 10, wherein the wall part forms part of said external wall.

12. Preparing device according to claim 1, wherein the second housing comprises a blow-off passage for vapor and dust particles extracted via the extraction duct, and the extraction duct comprises a blow-off end which is connected to the blow-off passage or is situated near the blow-off passage.

13. Preparing device according to claim 12, wherein the extraction duct comprises a filter situated near the blow-off passage.

14. Preparing device according to claim 1, wherein the preparing device comprises a plurality of mixing chambers, each mixing chamber comprises a separate extraction duct and the extraction ducts are formed by a housing which is formed as a single part.

15. Preparing device according to claim 1, wherein the extraction duct is hingedly connected to the first housing.

16. Preparing device according to claim 1, wherein the suction means comprises a ventilating fan.

17. Preparing device according to claim 1, wherein the further components are electrical components and pipework.

* * * * *